United States Patent [19]

Fuchs

[11] 4,312,807
[45] Jan. 26, 1982

[54] MONOAZO COMPOUNDS, PROCESS FOR THEIR MANUFACTURE AND THEIR USE

[75] Inventor: Otto Fuchs, Frankfurt am Main, Fed. Rep. of Germany

[73] Assignee: Hoechst Aktiengesellschaft, Frankfurt am Main, Fed. Rep. of Germany

[21] Appl. No.: 88,853

[22] Filed: Oct. 29, 1979

[30] Foreign Application Priority Data

Oct. 31, 1978 [DE] Fed. Rep. of Germany ....... 2847285

[51] Int. Cl.³ .......................................... C09B 29/00
[52] U.S. Cl. ..................................... 260/154; 260/157
[58] Field of Search ............................... 260/154, 157

[56] References Cited

U.S. PATENT DOCUMENTS

| 2,908,678 | 10/1959 | Goebel et al. | 260/154 |
| 3,109,842 | 11/1963 | Schilling et al. | 260/157 |
| 3,609,134 | 9/1971 | Mory | 260/152 |
| 3,963,694 | 6/1976 | Mory et al. | 260/154 |
| 3,985,725 | 10/1976 | Ribka et al. | 260/155 |
| 4,024,124 | 5/1977 | Ribka | 260/157 |
| 4,080,321 | 3/1978 | Kunstmann et al. | 260/157 |
| 4,150,019 | 4/1979 | Frölich et al. | 260/157 |
| 4,206,114 | 6/1980 | Roueche | 260/157 |
| 4,220,586 | 9/1980 | Cseh et al. | 260/154 X |

FOREIGN PATENT DOCUMENTS 1472137  5/1977  United Kingdom ............... 260/156

OTHER PUBLICATIONS

Müller, European Patent Application 737, Published Feb. 21, 1979.

*Primary Examiner*—John Doll
*Attorney, Agent, or Firm*—Curtis, Morris & Safford

[57] ABSTRACT

Monoazo compounds of the formula

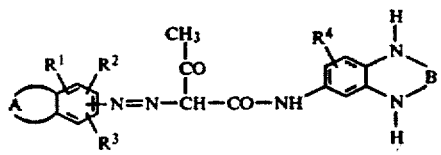

wherein

A stands for —NH—CO—NH—, —NH—CO—CO—NH— or —NH—CO—NH—CO—,

B stands for —CO— or —CO—CO—, $R^1$, $R^2$ and $R^3$ each stands for hydrogen, chlorine, methyl, methoxy, ethoxy, nitro or a group of the formula —COOR with R being hydrogen, methyl or ethyl and $R^4$ stands for hydrogen, chlorine, methyl, methoxy or ethoxy, with the proviso that when B stands for —CO— and when (1) A stands for —NH—CO—NH—
 (a) either $R^4$ is different from hydrogen, or
 (b) at least one of the radicals $R^1$, $R^2$ and $R^3$ stands for nitro or COOR, or
 (c) at least two of the radicals $R^1$, $R^2$ and $R^3$ are different from hydrogen, and when (2) A stands for —NH—CO—CO—NH— or —NH—CO—NH—CO'
 (a) $R^4$ is not in the 6-position or
 (b) at least one of the radicals $R^1$, $R^2$ and $R^3$ is different from hydrogen, are obtained by diazotizing compounds of the formula

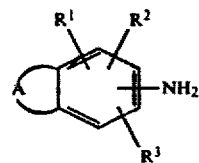

and coupling the resulting diazonium compounds with compounds of the formula

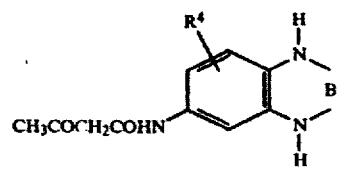

The compounds are coloring matters and are suitable in particular for pigmenting high molecular weight materials.

3 Claims, No Drawings

MONOAZO COMPOUNDS, PROCESS FOR THEIR MANUFACTURE AND THEIR USE

The present invention relates to monoazo compounds of the formula

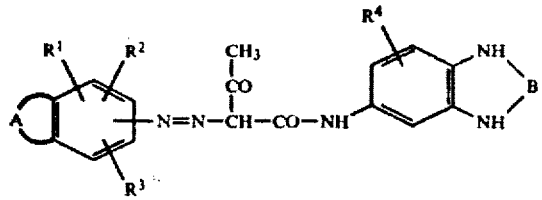

wherein

A stands for —NH—CO—NH—, —NH—CO—CO—NH— or —NH—CO—NH—CO—,

B stands for —CO— or —CO—CO—, $R^1$, $R^2$ and $R^3$ each stands for hydrogen, chlorine, methyl, methoxy, ethoxy, nitro or a group of the formula —COOR with R being hydrogen, methyl or ethyl and $R^4$ stands for hydrogen, chlorine, methyl, methoxy or ethoxy, with the proviso that when B stands for —CO— and when (1) A stands for —NH—CO—NH—

(a) either $R^4$ is different from hydrogen, or (b) at least one of the radicals $R^1$, $R^2$ and $R^3$ stands for nitro or COOR, or (c) at least two of the radicals $R^1$, $R^2$ and $R^3$ are different from hydrogen, and when (2) A stands for —NH—CO—CO—NH— or —NH—CO—NH—CO—

(a) $R^4$ is not in the 6-position or (b) at least one of the radicals $R^1$, $R^2$ and $R^3$ is different from hydrogen.

Preferred compounds are those wherein B stands for —CO—CO—, and compounds wherein at least one of the radicals $R^1$, $R^2$ and $R^3$ stands for nitro or —COOR, or compounds wherein at least two of the radicals $R^1$, $R^2$ and $R^3$ are different from hydrogen, and, furthermore, compounds wherein B stands for —CO— and $R^4$ is in the 4- or 7-position.

The present invention further relates to a process for the manufacture of the said compounds, which comprises coupling the diazonium salt of an amine of the formula

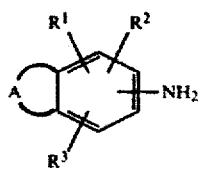

wherein A, $R^1$, $R^2$ and $R^3$ are as defined above, with a compound of the formula

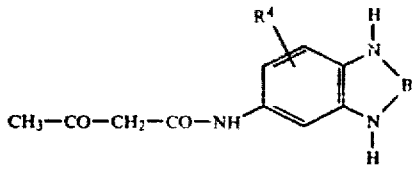

wherein B and $R^4$ are as defined above. The aforesaid meanings of A and B include the corresponding tautomeric forms.

Diazonium salts of the following amines may be used for coupling:

5-amino-6-methyl-benzimidazolone-(2)
5-amino-6-methoxy-benzimidazolone-(2)
5-amino-6-ethoxy-benzimidazolone-(2)
5-amino-4-chloro-benzimidazolone-(2)
5-amino-6-chloro-benzimidazolone-(2)
5-amino-7-methyl-benzimidazolone-(2)
5-amino-7-methoxy-benzimidazolone-(2)
5-amino-7-chloro-benzimidazolone-(2)
5-amino-4,6-dichloro-benzimidazolone-(2)
5-amino-4,6,7-trichloro-benzimidazolone-(2)
5-amino-6-nitro-benzimidazolone-(2)
5-amino-benzimidazolone-6-carboxylic acid
5-amino-benzimidazolone-6-carboxylic acid methyl ester
5-amino-benzimidazolone-6-carboxylic acid ethyl ester
6-amino-7-methyl-2,3-dihydroxy-quinoxaline
6-amino-7-methoxy-2,3-dihydroxy-quinoxaline
6-amino-7-ethoxy-2,3-dihydroxy-quinoxaline
6-amino-5-chloro-2,3-dihydroxy-quinoxaline
6-amino-7-chloro-2,3-dihydroxy-quinoxaline
6-amino-5,7-dichloro-2,3-dihydroxy-quinoxaline
6-amino-7-nitro-2,3-dihydroxy-quinoxaline
6-amino-8-methyl-2,3-dihydroxy-quinoxaline
6-amino-8-methoxy-2,3-dihydroxy-quinoxaline
6-amino-8-chloro-2,3-dihydroxy-quinoxaline
6-amino 2,3-dihydroxy-quinoxaline-7-carboxylic acid
6-amino-2,3-dihydroxy-quinoxaline-7-carboxylic acid methyl ester
6-amino-2,3-dihydroxy-quinoxaline-7-carboxylic acid ethyl ester
6-amino-2,4-dihydroxy-quinazoline
6-amino-7-chloro-2,4-dihydroxy-quinazoline
6-amino-8-nitro-2,4-dihydroxy-quinazoline
7-amino-2,4-dihydroxy-quinazoline
7-amino-6-chloro-2,4-dihydroxy-quinazoline.

Diazotization of the amines specified hereinbefore is carried out according to known methods.

The acetoacetyl compounds suitable for coupling are obtained by reaction of the amines specified hereinafter, by way of example, with diketene or acetoacetic acid esters.

5-Amino-benzimidazolone-(2)
5-amino-6-methyl-benzimidazolone-(2)
5-amino-7-methyl-benzimidazolone-(2)
5-amino-6-methoxy-benzimidazolone-(2)
5-amino-7-methoxy-benzimidazolone-(2)
5-amino-6-ethoxy-benzimidazolone-(2)
5-amino-7-ethoxy-benzimidazolone-(2)
5-amino-4-chloro-benzimidazolone-(2)
5-amino-6-chloro-benzimidazolone-(2)
5-amino-7-chloro-benzimidazolone-(2)
6-amino-2,3-dihydroxy-quinoxaline 6-amino-7-methyl-2,3-dihydroxy-quinoxaline
6-amino-7-methoxy-2,3-dihydroxy-quinoxaline
6-amino-7-ethoxy-2,3-dihydroxy-quinoxaline
6-amino-5-chloro-2,3-dihydroxy-quinoxaline
6-amino-7-chloro-2,3-dihydroxy-quinoxaline
6-amino-8-methyl-2,3-dihydroxy-quinoxaline
6-amino-8-methoxy-2,3-dihydroxy-quinoxaline
6-amino-8-ethoxy-2,3-dihydroxy-quinoxaline
6-amino-8-chloro-2,3-dihydroxy-quinoxaline.

Coupling is carried out generally under slightly acid conditions, optionally with the addition of substances with a coupling-promoting action, for example dispersing agents or organic solvents. Coupling can be carried out discontinuously or continuously. The suspension is suitably afterheated for some time on completion of the coupling reaction, optionally even to temperatures above 100° C. using a closed pressure vessel. Alternatively the crude pigment is isolated and washed and the isolated crude neutral pigment free from salt is subjected to a heat treatment in an aqueous or an aqueous solvent-containing suspension at a temperature between 60° and 180° C., preferably between 90° and 150° C.

A further variant of the aftertreatment with solvents consists in stirring the moist filter cake with a suitable solvent, distilling off the water and heating the suspension free from water or substantially free from water to a temperature above 100° C., removing the solvent with steam and isolating the pigment. Alternatively, the pigment can be filtered off direct from the solvent suspension, optionally after dilution, with, for example, methanol, then the filter is washed with methanol and the pigment is dried.

Suitable solvents to be added to the suspension are, by way of example: toluene, xylene, chlorobenzene, o-dichlorobenzene, nitrobenzene, pyridine, picoline, quinoline, methanol, ethanol, isopropanol, n-butanol, isobutanol, glycol monomethyl ether, glycol monoethyl ether, diglycol monomethyl or -ethyl ether, acetone, methylethyl ketone, dimethylformamide, dimethylsulfoxide, dimethylacetamide, N-methylpyrrolidone and tetramethylene sulfone.

The products according to the present invention are valuable pigments which can be used in all pigment application fields. They are very suitable for pigmenting stoving lacquers, where they display excellent fastness to light and to weathering, good fastness to overlacquering, and a good thermostability even at very high stoving temperatures.

The compounds according to the invention are particularly interesting for coloring high-molecular weight materials because of their excellent fastness to migration and their unusually high thermostability. When processed in polyolefins, those pigments according to the invention which contain two 5-membered heterocyclic rings in the molecule display a thermoresistance that is very high for monoazo pigments. This thermoresistance is still increased when the molecule contains a 6-membered heterocyclic ring and it is at its peak when the molecule contains two 6-membered heterocyclic rings.

This high resistance could not be reached hitherto with monoazo pigments without lake-forming groups.

The following examples illustrate the invention. Percentages are by weight.

EXAMPLE 1

6.2 g 7-amino-6,8-dichloro-2,3-dihydroxy-quinoxaline are stirred in 20 ml 30% hydrochloric acid and 20 ml water at 80° C. to obtain the hydrochloride. The suspension is diluted with 250 ml of water and subsequently diazotization is carried out at 10° to 15° C. using a sodium nitrite solution.

6.9 g of 6-acetoacetylamino-7-methyl-2,3-dihydroxyquinoxaline are dissolved in 200 ml of water by adding 9 ml of 30% sodium hydroxide solution. The resulting solution is slowly added to a stirred solution of 9 ml of glacial acetic acid and 0.25 g of the condensation product of 1 mol of stearyl alcohol and 25 mols of ethylene oxide in 100 ml of water. The clarified diazonium salt solution is slowly dropped into the resulting suspension while adding simultaneously 3% sodium hydroxide solution in a manner such that a pH between 4.5–5.0 is maintained during the coupling reaction.

On completion of the coupling reaction, the batch is heated for 30 minutes to 80° C., then crude pigment formed is filtered off hot and washed with hot water. Yield: 167 g of moist filter cake.

The moist filter cake is stirred with 140 ml of water and 150 g of isobutanol and heated subsequently in a pressure vessel to 150° C. for 5 hours while stirring. After cooling below the boiling point, the isobutanol is distilled off with steam, the pigment is filtered off, washed with hot water, dried and milled.

13.0 g of a yellow, microcrystalline pigment powder are obtained. When incorporating the pigment into polyvinyl chloride by rolling, greenish-yellow films are obtained, wherein the pigment displays good fastness to migration and a very fastness to light. When processed in high-density polyethylene, the dyeings exhibit a very high thermoresistance.

EXAMPLE 2

5.3 g of 6-amino-7-chloro-2,3-dihydroxyquinoxaline are converted into the hydrochloride by heating with 20 ml of 30% hydrochloric acid and 20 ml of glacial acetic acid. 3.5 ml of 40% sodium nitrite solution are dropped into the suspension of the hydrochloride at 0° to 5° C., the batch is stirred for 30 minutes and diluted with 150 ml of water.

The clarified diazonium salt solution is dropped into the suspension of 7.5 g of 6-acetoacetylamino-7-methoxy-2,3-dihydroxy-quinoxaline prepared according to Example 1, while simultaneously adding 3% sodium hydroxide solution in a manner such that a pH between 0.5 and 5.5 is maintained. On completion of the coupling reaction, the mixture is briefly heated to the boil, the crude pigment formed is filtered off and washed with hot water. Yield: 64.0 g of moist crude pigment.

The moist pigment is aftertreated in the manner described in Example 1. 12.3 g of a reddish-yellow powder are obtained which exhibits a high thermostability when incorporated into high-density polyethylene. When incorporated by rolling into PVC, this pigments yields reddish-yellow dyeings which are distinguished by a good fastness to migration and a high fastness to light.

EXAMPLE 3

5.2 g of 5-amino-benzimidazol-2-on-6-carboxylic acid methyl ester (obtained by nitration of the benzimidazol-2-on-carboxylic acid methyl ester and reduction) are diazotized in 20 ml of 30% hydrochloric acid and 125 ml of water at 0° C. In a second vessel there are dissolved 6.7 g of 5-acetoacetylamino-6-chlorobenzimidazolone in 200 ml of water by adding 9 ml of 33% sodium hydroxide solution. The coupling component is precipitated by adding 9 ml of glacial acetic acid and 50 ml of pyridine are added. The clarified diazonium salt solution is slowly added dropwise at 20° C. to the suspension of the coupling component. On completion of the coupling reaction, the batch is heated 80° C. for 30 minutes, the crude pigment is isolated by filtration and washed with hot water. The moist crude pigment is aftertreated in the manner described in Example 1. 11.8 g of a yellow crystal powder are obtained.

Yellow stoving lacquerings obtained with these pigments have good fastness to overlacquering and excellent fastness to light and to weathering.

In the following table there are listed a series of further pigments obtained by coupling the amines specified subs A with the acetoacetic acid arylides of the amines specified sub B. Column C indicates the solvents used for the aftertreatment and column D indicates the shade obtained by incorporation of the pigments into polyvinyl chloride.

| No. | A | B | C | D |
|---|---|---|---|---|
| 4 | 5-amino-6-chloro-benzimidazolone-(2) | 5-amino-benzimidazolone-(2) | methanol | orange |
| 5 | 5-amino-6-chloro-benzimidazolone-(2) | 5-amino-6-chloro-benzimidazolone-(2) | methyl-ethyl-ketone | orange |
| 6 | 5-amino-6-chloro-benzimidazolone-(2) | 5-amino-7-methyl-benzimidazolone-(2) | isobutanol | orange |
| 7 | 5-amino-6-chloro-benzimidazolone-(2) | 6-amino-7-chloro-2,3-dihydroxy-quinoxaline | isobutanol | greenish-yellow |
| 8 | 5-amino-6-chloro-benzimidazolone-(2) | 6-amino-7-methyl-2,3-dihydroxy-quinoxaline | isobutanol | yellow |
| 9 | 5-amino-6-chloro-benzimidazolone-(2) | 6-amino-7-methoxy-2,3-dihydroxy-quinoxaline | isobutanol | reddish-yellow |
| 10 | 5-amino-5-nitro-benzidazolone-(2) | 5-amino-benzimidazolone-(2) | isobutanol | yellow |
| 11 | 5-amino-benzimid-(2)-on-6-carboxylic acid | 5-amino-6-chloro-benzimidazolone-(2) | isobutanol | greenish-yellow |
| 12 | 5-amino-benzimidazol-2-on-6-carboxylic acid | 5-amino-benzimidazolone-(2) | isobutanol | yellow |
| 13 | 5-amino-benzimidazol-2-on-6-carboxylic acid | 6-amino-7-methoxy-2,3-dihydroxy-quinoxaline | " | yellow |
| 14 | 5-amino-benzimidazol-2-on-6-carboxylic acid | 5-amino-7-chloro-benzimidazolone-(2) | " | yellow |
| 15 | 5-amino-benzimidazol-2-on-6-carboxylic acid | 5-amino-7-methoxy-benzimidazolone-(2) | " | yellow |
| 16 | 5-amino-benzimidazol-2-on-6-carboxylic acid | 5-amino-7-methyl-benzimidazolone-(2) | " | yellow |
| 17 | 5-amino-benzimidazol-2-on-6-carboxylic acid | 6-amino-8-methoxy-2,3-dihydroxy-quinoxaline | " | yellow |
| 18 | 5-amino-benzimidazol-2-on-6-carboxylic acid methyl ester | 6-amino-7-chloro-2,3-dihydroxy-quinoxaline | " | yellow |
| 19 | 5-amino-benzimidazol-2-on-6-carboxylic acid methyl ester | 6-amino-7-methyl-2,3-dihydroxy-quinoxaline | " | yellow |
| 20 | 5-amino-benzimidazol-2-on-6-carboxylic acid ethyl ester | 5-amino-benzimidazolone-(2) | chlorobenzene | yellow |
| 21 | 5-amino-benzimidazol-2-on-6-carboxylic acid ethyl ester | 5-amino-6-chloro-benzimidazolone-(2) | isobutanol | yellow |
| 22 | 5-amino-4,6-dichloro-benzimidazolone-(2) | 5-amino-benzimidazolone-(2) | pyridine | greenish-yellow |
| 23 | 5-amino-4,6,7-trichloro-benzimidazolone-(2) | 5-amino-benzimidazolone-(2) | isobutanol | reddish-yellow |
| 24 | 5-amino-4,6,7-trichloro-benzimidazolone-(2) | 6-amino-7-methoxy-2,3-dihydroxy-quinoxaline | dimethyl-formamide | reddish-yellow |
| 25 | 6-amino-7-chloro-2,3-dihydroxy-quinoxaline | 5-amino-benzimidazolone-(2) | isobutanol | reddish-yellow |
| 26 | 6-amino-7-chloro-2,3-dihydroxy- | 5-amino-6-chloro-benzimidazolone-(2) | isobutanol | reddish-yellow |

| No. | A | B | C | D |
|---|---|---|---|---|
| 27 | 6-amino-7-chloro-2,3-dihydroxy-quinoxaline | 5-amino-6-methyl-benzimidazolone-(2) | " | orange |
| 28 | 6-amino-7-chloro-2,3-dihydroxy-quinoxaline | 5-amino-6-methoxy-benzimidazolone-(2) | " | orange |
| 29 | 6-amino-7-chloro-2,3-dihydroxy-quinoxaline | 5-amino-7-chloro-benzimidazolone-(2) | " | greenish-yellow |
| 30 | 6-amino-7-chloro-2,3-dihydroxy-quinoxaline | 5-amino-7-methyl-benzimidazolone-(2) | " | yellow |
| 31 | 6-amino-7-chloro-2,3-dihydroxy-quinoxaline | 5-amino-7-methoxy-benzimidazolone-(2) | " | yellow |
| 32 | 6-amino-7-chloro-2,3-dihydroxy-quinoxaline | 6-amino-2,3-dihydroxy-quinoxaline | " | yellow |
| 33 | 6-amino-7-chloro-2,3-dihydroxy-quinoxaline | 6-amino-7-chloro-2,3-dihydroxy-quinoxaline | " | reddish-yellow |
| 34 | 6-amino-7-chloro-2,3-dihydroxy-quinoxaline | 6-amino-7-methyl-2,3-dihydroxy-quinoxaline | " | yellow |
| 35 | 6-amino-7-chloro-2,3-dihydroxy-quinoxaline | 6-amino-7-methoxy-2,3-dihydroxxy-quinoxaline | " | reddish-yellow |
| 36 | 6-amino-5,7-dichloro-2,3-dihydroxy-quinoxaline | 5-amino-6-chloro-benzimidazolone-(2) | " | greenish-yellow |
| 37 | 6-amino-5,7-dichloro-2,3-dihydroxy-quinoxaline | 5-amino-benzimidazolone-(2) | " | reddish-yellow |
| 38 | 6-amino-5,7-dichloro-2,3-dihydroxy-quinoxaline | 6-amino-7-methyl-2,3-dihydroxy-quinoxaline | " | yellow |
| 39 | 6-amino-5,7-dichloro-2,3-dihydroxy-quinoxaline | 6-amino-7-methoxy-2,3-dihydroxy-quinoxaline | " | reddish-yellow |
| 40 | 6-amino-2,3-dihydroxy-quinoxaline-7-carboxylic acid | 5-amino-benzimidazolone-(2) | " | greenish-yellow |
| 41 | 6-amino-2,3-dihydroxy-quinoxaline-7-carboxylic acid | 5-amino-6-chloro-benzimidazolone-(2) | " | greenish-yellow |
| 42 | 6-amino-2,3-dihydroxy-quinoxaline-7-carboxylic acid | 6-amino-7-methyl-2,3-dihydroxy-quinoxaline | " | greenish-yellow |
| 43 | 6-amino-2,3-dihydroxy-quinoxaline-7-carboxylic acid | 5-amino-6-methyl-benzimidazolone-(2) | isobutanol | yellow |
| 44 | 6-amino-2,3-dihydroxy-quinoxaline-7-carboxylic acid | 5-amino-6-methoxy-benzimidazolone-(2) | " | yellow |
| 45 | 6-amino-2,3-dihydroxy-quinoxaline-7-carboxylic acid | 5-amino-7-chloro-benzimidazolone-(2) | " | yellow |
| 46 | 6-amino-2,3-dihydroxy-quinoxaline-7-carboxylic acid | 5-amino-7-methoxy-benzimidazolone-(2) | " | yellow |
| 47 | 6-amino-2,3-dihydroxy-quinoxaline-7-carboxylic acid | 5-amino-7-methyl-benzimidazolone-(2) | " | reddish-yellow |
| 48 | 6-amino-7-methyl-2,3-dihydroxy-quinoxaline | 5-amino-benzimidazolone-(2) | " | greenish-yellow |
| 49 | 6-amino-7-methyl-2,3-dihydroxy-quinoxaline | 5-amino-6-chloro-benzimidazolone-(2) | " | reddish-yellow |
| 50 | 6-amino-7-methyl-2,3-dihydroxy-quinoxaline | 5-amino-6-methyl-benzimidazolone-(2) | " | reddish-yellow |
| 51 | 6-amino-7-methyl-2,3-dihydroxy-quinoxaline | 5-amino-6-methoxy-benzimidazolone-(2) | " | orange |

-continued

| No. | A | B | C | D |
|---|---|---|---|---|
| 52 | 6-amino-7-methyl-2,3-dihydroxy-quinoxaline | 5-amino-7-chloro-benzimidazolone-(2) | " | yellow |
| 53 | 6-amino-7-methyl-2,3-dihydroxy-quinoxaline | 5-amino-7-methyl-benzimidazolone-(2) | " | yellow |
| 54 | 6-amino-7-methyl-2,3-dihydroxy-quinoxaline | 5-amino-7-methoxy-benzimidazolone-(2) | " | yellow |
| 55 | 6-amino-7-methyl-2,3-dihydroxy-quinoxaline | 6-amino-7-chloro-2,3-dihydroxy-quinoxaline | " | yellow |
| 56 | 6-amino-7-nitro-2,3-dihydroxy-quinoxaline | 5-amino-benzimidazolone-(2) | " | orange |
| 57 | 6-amino-7-nitro-2,3-dihydroxy-quinoxaline | 5-amino-6-chloro-benzimidazolone-(2) | " | orange |
| 58 | 6-amino-7-nitro-2,3-dihydroxy-quinoxaline | 6-amino-7-methyl-2,3-dihydroxy-quinoxaline | " | yellow |
| 59 | 6-amino-7-nitro-2,3-dihydroxy-quinoxaline | 6-amino-7-methoxy-2,3-dihydroxy-quinoxaline | " | orange |
| 60 | 6-amino-2,4-dihydroxy-quinazoline | 5-amino-benzimidazolone-(2) | " | greenish-yellow |
| 61 | 6-amino-2,4-dihydroxy-quinazoline | 5-amino-6-methyl-benzimidazolone-(2) | isobutanol | yellow |
| 62 | 6-amino-2,4-dihydroxy-quinazoline | 5-amino-7-chloro-benzimidazolone-(2) | " | yellow |
| 63 | 6-amino-2,4-dihydroxy-quinazoline | 5-amino-7-methyl-benzimidazolone-(2) | " | yellow |
| 64 | 6-amino-2,4-dihydroxy-quinazoline | 6-amino-7-methyl-2,3-dihydroxy-quinoxaline | " | greenish-yellow |
| 65 | 7-amino-2,4-dihydroxy-quinazoline | 5-amino-benzimidazolone-(2) | " | greenish-yellow |
| 66 | 6-amino-7-chloro-2,4-dihydroxy-quinazoline | 5-amino-benzimidazolone-(2) | " | reddish-yellow |
| 67 | 6-amino-8-nitro-2,4-dihydroxy-quinazoline | 5-amino-benzimidazolone-(2) | " | yellow |
| 68 | 6-amino-8-nitro-2,4-dihydroxy-quinazoline | 5-amino-6-chloro-benzimidazolone-(2) | " | reddish-yellow |
| 69 | 6-amino-8-nitro-2,4-dihydroxy-quinazoline | 5-amino-6-methyl-benzimidazolone-(2) | " | yellow |
| 70 | 6-amino-8-nitro-2,4-dihydroxy-quinazoline | 6-amino-7-methyl-2,3-dihydroxy-quinoxaline | " | yellow |

What is claimed is:

1. A monoazo compound of the formula

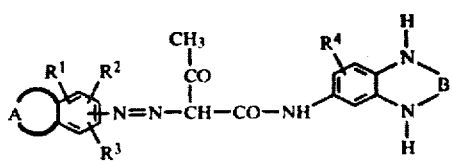

wherein

A is —NH—CO—NH—, —NH—CO—CO—NH— or —NH—CO—NH—CO—;

B is —CO—CO—;

$R^1$, $R^2$ and $R^3$ each stands for hydrogen, chlorine, methyl, methoxy, ethoxy, nitro or —COOR in which R is hydrogen, methyl or ethyl; and $R^4$ is hydrogen, chlorine, methyl, methoxy or ethoxy.

2. A compound as claimed in claim 1 wherein at least one of $R^1$, $R^2$ and $R^3$ is nitro or —COOR.

3. A compound as claimed in claim 1 wherein at least two of $R^1$, $R^2$ and $R^3$ are not hydrogen.